United States Patent [19]
Cash

[11] Patent Number: 5,729,197
[45] Date of Patent: Mar. 17, 1998

[54] AUTOMATIC, SELF-TRIGGERING ALARM PROCESSING SYSTEM AND METHOD

[75] Inventor: Jeffrey M. Cash, Bradford, Pa.

[73] Assignee: Ultra Communications Corporation, Canada

[21] Appl. No.: 604,849

[22] Filed: Feb. 22, 1996

[51] Int. Cl.6 .................................................. G08B 1/08
[52] U.S. Cl. ...................... 340/539; 340/506; 340/511; 379/41; 379/42; 455/331
[58] Field of Search ........................ 379/41, 42, 47; 340/539, 310.01, 534, 531, 535, 536, 511, 506; 455/331

[56] References Cited

U.S. PATENT DOCUMENTS

| | | | |
|---|---|---|---|
| 4,088,986 | 5/1978 | Boucher | 340/237 S |
| 4,593,272 | 6/1986 | Berkowitz | 340/500 |
| 4,716,582 | 12/1987 | Blanchard et al. | 379/42 |
| 4,801,924 | 1/1989 | Burgmann et al. | 340/521 |
| 4,926,158 | 5/1990 | Zeigler | 340/310 A |
| 4,993,059 | 2/1991 | Smith et al. | 379/39 |
| 5,099,233 | 3/1992 | Kennan | 340/825.72 |
| 5,134,644 | 7/1992 | Garton et al. | 379/39 |
| 5,136,285 | 8/1992 | Okuyama | 340/870.11 |
| 5,146,209 | 9/1992 | Beghelli | 340/693 |
| 5,148,159 | 9/1992 | Clark et al. | 340/825.22 |
| 5,200,745 | 4/1993 | Takai et al. | 340/825.65 |
| 5,257,007 | 10/1993 | Steil et al. | 340/539 |
| 5,568,535 | 10/1996 | Sheffer et al. | 379/39 |

FOREIGN PATENT DOCUMENTS

| | | |
|---|---|---|
| 0 324 564 A2 | 7/1989 | European Pat. Off. |
| 28 39 855 | 3/1980 | Germany . |
| 54-127238 | 10/1979 | Japan . |

OTHER PUBLICATIONS

Gladstone, Bernard, "Home Improvement," The New York Times, p. C4, Jul. 1986.

Primary Examiner—Jeffery Hofsass
Assistant Examiner—Daryl C. Pope
Attorney, Agent, or Firm—Heslin & Rothenberg, P.C.

[57] ABSTRACT

Various embodiments of an automatic alarm and communications processing system/method are presented. The alarm processing system/method monitors at least one sensor unit which is designed to provide an alarm signal upon occurrence of a corresponding predefined condition. An alarm signal is received at a central unit and a predefined alarm message is retrieved from memory based thereon. A selected telecommunications medium is then designated from at least two telecommunications medium coupled to the alarm processing system, and the retrieved predefined alarm message is automatically sent over the selected telecommunications medium. Preferably, the alarm processing system is powered down until an alarm signal is received at the central unit. Upon receipt of the alarm signal, powering of the alarm processing system is triggered, and subsequent to transmission of a predefined alarm message, powering of the alarm processing system is automatically removed. A detachable external programmer couples to and powers the central unit for custom programming of response parameters.

33 Claims, 4 Drawing Sheets

AUTOMATIC, SELF-TRIGGERING ALARM PROCESSING SYSTEM AND METHOD

TECHNICAL FIELD

This invention relates in general to security systems and, more particularly, to systems and methods including a central controller, multiple remote detectors which interact with the controller, and an automated communications system comprising part of the central controller for communicating an alarm message to a remote location.

BACKGROUND ART

A number of different types of security systems have been marketed or proposed which include a central controller and a plurality of remote sensors designed to respond to a particular, possibly hazardous environmental condition, such as fire, an intruder, explosive or poisonous gas, temperature extremes, radiation, water, etc., or to several such conditions. The central controller monitors the status of the various sensors and sounds an alarm in response to a potentially hazardous condition detected by one or more of the sensors.

The majority of such systems are designed to be installed with the controller permanently wired to the various sensors and permanently wired to the ac electrical distribution system available at the location of the controller. In addition, many of these systems are modular in design. The central processor may be provided with circuitry for responding to an alarm signal received from a remotely located sensor and, through the provision of separate components, may respond to the condition in various ways, such as by activating an audible and/or visual alarm, automatically dialing a remote or central fire fighting or security installation, etc. In the known systems, these components are selectably provided, may be permanently mounted and are typically hardwired into the controller, or a power supply at the location, or both.

Alarm system deficiencies can be divided into three categories, whereby most alarm systems fall into at least one of these categories.

First are systems dependent on hardwired electrical current. Most all alarms derive their power requirements from one electrical source or circuit in a traditional building electrical control panel. Should this power source fail or be interrupted for one of many reasons, the system fails or in some cases, will switch to an alternate power source such as a battery back-up, i.e., if provided. Because of an alarm system's need for electrical energy, a battery back-up is a temporary solution, generally providing up to an additional eight hours of power source. However, in practice, battery back-ups often remain unchecked for long periods of time and when called upon may be too run-down to provide adequate means of protection. Also, in many areas, such as natural disaster plagued areas, electrical power when out may not be restored for long intervals of time, thereby severely stressing even the best battery back-up system.

A second category of vulnerability of the more expensive and complex alarm systems is an exclusive reliance on transmission of signals over standard telephone transmission lines. Should the system be of the now common silent variety as in the more advanced monitor type of system such as "SNIF", "ADT" or "PRI-DET", and should transmission lines be interrupted for one of many possible reasons, then the system would be rendered valueless. Because such systems have become dominant in the marketplace, it is important to acknowledge this vulnerability, especially in natural disaster plagued areas where telephone transmission line failure is relatively commonplace.

A still further area of vulnerability exists with those systems inherently presenting the possibility of human error. Recent improvements in alarm technology enable some devices to telephone a friend or a neighbor or to call a monitoring center and transmit a prerecorded message. These dialing devices are limited and are typically totally dependent on telephone transmission lines. Further, human error could be amplified in many cases since if only one person is to receive a message, the system necessarily relies on that individual's ability to receive and interpret the information correctly and then relay the information in a timely fashion to a responsible individual who can take action. Such a system of relaying calls is time consuming and as is well known in any emergency situation, time is critical.

Thus, there continues to exist a need in the security systems art for a more secure, independent alarm status monitoring system and method. The present invention addresses this need.

DISCLOSURE OF INVENTION

Briefly summarized, the invention comprises in a first aspect an alarm processing system for monitoring at least one sensor unit, wherein each sensor unit provides an alarm signal upon occurrence of a corresponding predefined condition. The alarm processing system includes input means for receiving an alarm signal generated by a sensor unit of the at least one sensor unit upon occurrence of that sensor unit's corresponding predefined condition. A central processing unit is coupled to retrieve from memory a predefined alarm message in response to the alarm signal. Coupled to the alarm processing system are at least two telecommunications medium and the alarm processing system further includes means for designating a selected telecommunications medium from the at least two different telecommunications medium and means for automatically sending the predefined alarm message across the selected telecommunications medium.

In another aspect, a self-trigger, alarm processing system is presented for monitoring at least one sensor unit. Each sensor unit provides an alarm signal upon occurrence of a corresponding predefined condition. The alarm processing system, which is coupled to at least one telecommunications medium, includes means for receiving an alarm signal generated by a sensor unit of the at least one sensor unit upon occurrence of that sensor unit's corresponding predefined condition. The system also includes power means for powering the alarm processing system and means for triggering the power means upon receipt of the alarm signal. The power means includes means for deriving power from the at least one telecommunications medium to drive the alarm processing system upon triggering by the means for triggering.

In still another aspect, the invention comprises an automated method implemented within an alarm processing system for monitoring and responding to at least one sensor unit. Each sensor unit provides an alarm signal upon occurrence of a corresponding predefined condition. The automated method includes the steps of: receiving an alarm signal generated by one of the sensor units upon occurrence of that sensor unit's corresponding predefined condition; automatically triggering powering of the alarm processing system upon receipt of the alarm signal; retrieving from computer memory a predefined alarm message in response to the alarm signal; designating a selected telecommunications medium from at least two different telecommunications medium coupled to the alarm processing system; and automatically sending the predefined alarm message across the selected telecommunications medium.

In a further aspect, an automated method for monitoring at least one sensor unit is provided for implementation within an alarm processing system. Each sensor unit provides an alarm signal to the alarm processing system upon occurrence of a corresponding predefined condition. The automated method includes: receiving an alarm signal generated by one sensor unit upon occurrence of that unit's corresponding predefined condition; and automatically triggering powering of the alarm processing system upon receipt of the alarm signal.

To restate, the present invention comprises an automatic, self-triggered alarm processing system and method designed to back-up or replace an existing alarm control system, thereby eliminating many key points of vulnerability inherent in existing alarm systems. Preferably, the system/method employs a non-volatile memory and processing is powered from one of a plurality of available energy sources by means of an automatic discretionary circuit which is activated upon receipt of an alarm signal from a remote sensor unit. Power can be derived from an existing alarm control panel, a battery back-up to an existing alarm control panel, a telephone transmission line, a cellular phone power supply, a cellular phone battery back-up, an independent power supply and/or an independent power supply back-up.

Preferably, the alarm processing system is programmed via a detachable external programming module to ensure security. Programmed patterns are stored in non-volatile memory so that parameters remain intact notwithstanding interruption in power. With appropriate program instructions, consecutive dial-out of a plurality of numbers is available, as are detection of call progress tones, programmable pauses, synthesized voice transmission, DTMF or pulse digit transmission, digital numeric or alphanumeric transmission and programmable repeats. The alarm processing system may be employed with a variety of different sensors, such as wired, wireless, smoke, fire, intrusion, electrical or radio variation, liquid flow, pressure variances, leakage detection, liquid, vapor, gas, etc. By improving the choice of power source and the choice of transmission medium, a significant decrease in the occurrence of alarm failure is achieved.

BRIEF DESCRIPTION OF DRAWINGS

These and other objects, advantages and features of the present invention will be more readily understood from the following detailed description of certain preferred embodiments of the invention, when considered in conjunction with the accompanying drawings in which.

BEST MODE FOR CARRYING OUT THE INVENTION

Figure 1:
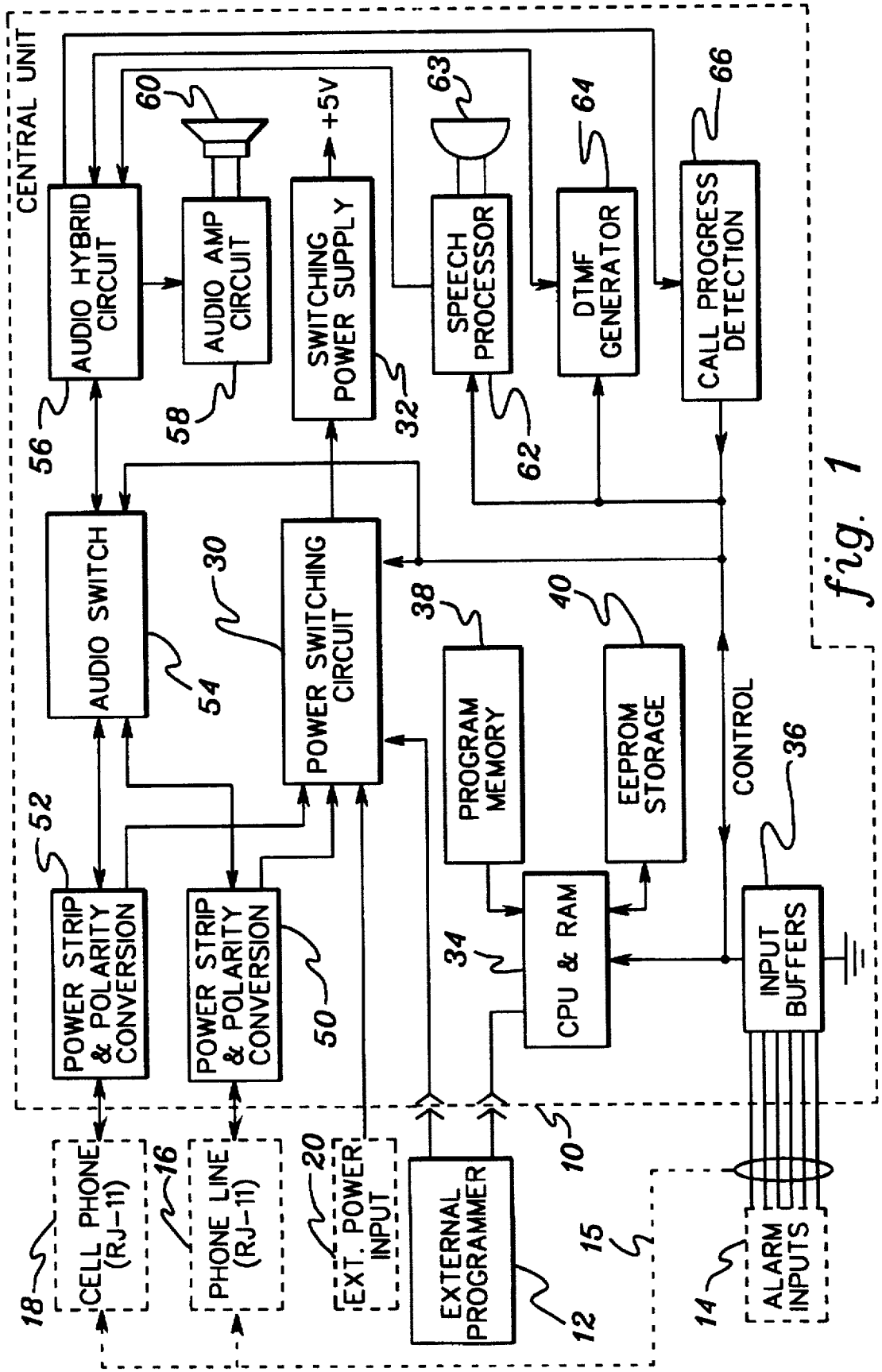
FIG. 1 is a schematic overview of one embodiment of an alarm processing system in accordance with the present invention.

FIG. 1 is a component diagram of one embodiment of an alarm processing system in accordance with the present invention. This system includes a central unit 10 and a detachable, external programmer 12 electrically, coupled to central unit 10 for programming thereof as explained below. Also coupled to central unit 10 are a plurality of alarm inputs 14 from an existing alarm system (not shown) or from a plurality of remote sensor units of any variety, such as wired, wireless, smoke, fire, intrusion, electrical or radio variation, liquid flow, pressure variances, leakage detection, liquid, vapor, gas detectors, etc. The alarm processing system depicted in FIG. 1 is also coupled to at least two different telecommunications medium, such as a conventional telephone line 16 and a cellular phone unit 18. In this embodiment, the alarm processing system also couples to an external power input 20 which may comprise any desired one of multiple ac or dc power sources which may be available for hardwiring to the system as a backup power source.

One aspect of an alarm processing system pursuant to the present invention is supplying of the central, status monitor unit with electrical power from a selected one of a plurality of power sources. As shown, a power switching circuit 30 within central unit 10 is electrically coupled to multiple power sources, including conventional telephone line 16, cellular phone unit 18, and external power input 20. Power switching circuit 30 couples to conventional telephone line 16 via a first power strip & polarity conversion circuit 50 and to cellular phone unit 18 via a second power strip & polarity conversion circuit 52. Circuits 50 & 52 operate to reverse the negative polarity of the phone line unit. Steering diodes are employed within circuit 30 to logically 'OR' these power sources such that power from a selected active power source is passed to a power switching circuit 32, which provides a standard +5 volts to power the circuitry of central unit 10.

In order to power unit 10 from the standard RJ-11 jack of phone line 16 or cell phone 18, special consideration must be given to the overall current draw of the unit using a worst case current supply scenario from the RJ-11 jack. If the current should fall below the level available, then the unit will fail to operate properly. Typically, current in the range of 20 milliamps will be available. In accordance with the present invention a special powering sequence is employed within unit 10. Specifically, the unit's controller, CPU & RAM 34, activates selected circuitry of the unit as required to sequentially carry out the functions presented herein. Upon completion of a given function, the selected circuitry is deactivated in order to minimize the unit's overall current draw. In this manner, it is possible to power unit 10 from the standard RJ-11 jack of phone line 16 or cellular phone line 18. The ability to operationally power from these phone lines is a significant aspect of this invention.

As discussed below, central unit 10 is unpowered until an alarm signal from one of the remote sensor units 14 is received at input buffers 36. At that time, the unit's controller, CPU & RAM 34, initializes and begins drawing power by default, for example, from the conventional telephone line. This can be accomplished by connecting alarm inputs 14 via lines 15 to both phone line 16 and cell phone 18 such that upon closure of a dry contact at a remote alarm, the alarm signal trips one or both of these phone jacks to an active state, thereby supplying power to power switching circuit 30.

If telephone line power is unavailable, then the cellular phone unit is automatically tapped to supply power to the central unit since the power sources are connected to the system through an isolated steering diode arrangement, i.e., power switching circuit 30. Normally, a standard telephone line supplies a negative 24 to 52 volts of power while a cellular phone unit supplies only 12 volts. Thus, central unit 10 is preferably designed to default to the anticipated highest supply voltage first, and then fall back to the lower available voltage supply. Thus, the cellular phone unit is blocked from supplying system power whenever a higher potential voltage is available on the defaulted telephone communication line 16.

As a further input, unit 10 has the capability of being connected to any external voltage supply, such as a 24 volt dc supply, i.e., if available. Alternatively, the external power input 20 could be connected from a power supply of an existing alarm system panel or, a battery back-up thereto or to a conventional 110 volt power supply or an independent battery back-up designed to supply an alternate power source in the event of failure of the conventional power line and the cellular phone unit.

Automatic switching between power sources is controlled by CPU & RAM 34. This control circuitry couples to the remote sensor units 14 via a respective contact relay, e.g., within input buffers 36. The contacts may be manual switches, relay contacts or other types of devices providing a closure of two wires, i.e., a common and an active line. When an associated contact closure is sensed, power is applied to the central unit by connection of a selected, active phone/power source to unit 10 through the contact closure. CPU & RAM 34 then initializes and begins to process instructions and parameters from program memory 38 and EEPROM storage 40, respectively.

A first activity of the controller is to determine which remote sensor unit provided the alarm signal which resulted in powering of the central unit, i.e., which contact has been closed within input buffers 36. Controller 34 scans all inputs for the closed contact, and once identified, it initiates closure of a connection to a preselected telecommunications medium 16 or 18. This involves first initiating an audio switch 54 and an audio hybrid circuit 56. Upon entering an "off hook" state, the audio signal (dial tone, etc.) is passed through audio switch 54 to audio hybrid circuit 56. Circuit 56 operates to separate send audio from receive audio for processing by the central unit. Such a circuit is commonly available in the art.

At this point, a call progress detection circuit 66 is activated and call audio and/or tones are routed to circuit 66, which "listens" to the tones active on the phone connection and determines whether the connection is valid. If valid, then the controller 34 deactivates call progress detection circuit 66 and begins to send control codes to a DTMF generator 64 for dialing a prestored first telephone number. If call progress detection circuit 66 does not confirm a valid telephone line connection, then the central unit defaults to a cellular telephone signalling mode through cellular phone unit 18, and reinitiates processing of the call. After a valid telecommunications line connection is established to a predesignated remote receiver location, call progress detection circuit 66 is reinitiated to listen for either a ring tone or a busy signal. Failing either of these, the unit assumes that a valid voice connection is established and controller 34 begins output processing of the associated, retrieved alarm message via the speech processor 62. As shown, processor 62 is coupled to a microphone 63 for user customization of messages stored for transmission upon receipt of a respective alarm signal. This programming capability is discussed further below.

The controller mixes the output of the speech processor through audio hybrid circuit 56 in the send mode and the message is transmitted. The same process occurs if the telecommunications connection occurs via a cellular phone connection. As an option, an audio amplifier circuit 58 and associated speaker 60 could be provided for generating an audible output of a received or transmitted message passing via audio hybrid circuit 56.

One of ordinary skill in the art will recognize from the above discussion that unit 10 is preferably fabricated to minimize amperage draw at any given point in time by a selective activation/deactivation of circuitry required to accomplish the functions discussed in the manner set forth. Accomplishing this minimization of current draw is needed in order to ensure operability of the unit when powered by either the RJ-11 jack of the phone line or the RJ-11 jack of the cell phone. An activation/deactivation schedule can be provided to the controller in firmware to ensure that the controller will activate those portions of unit 10 needed to accomplish a particular function.

Figure 2A:
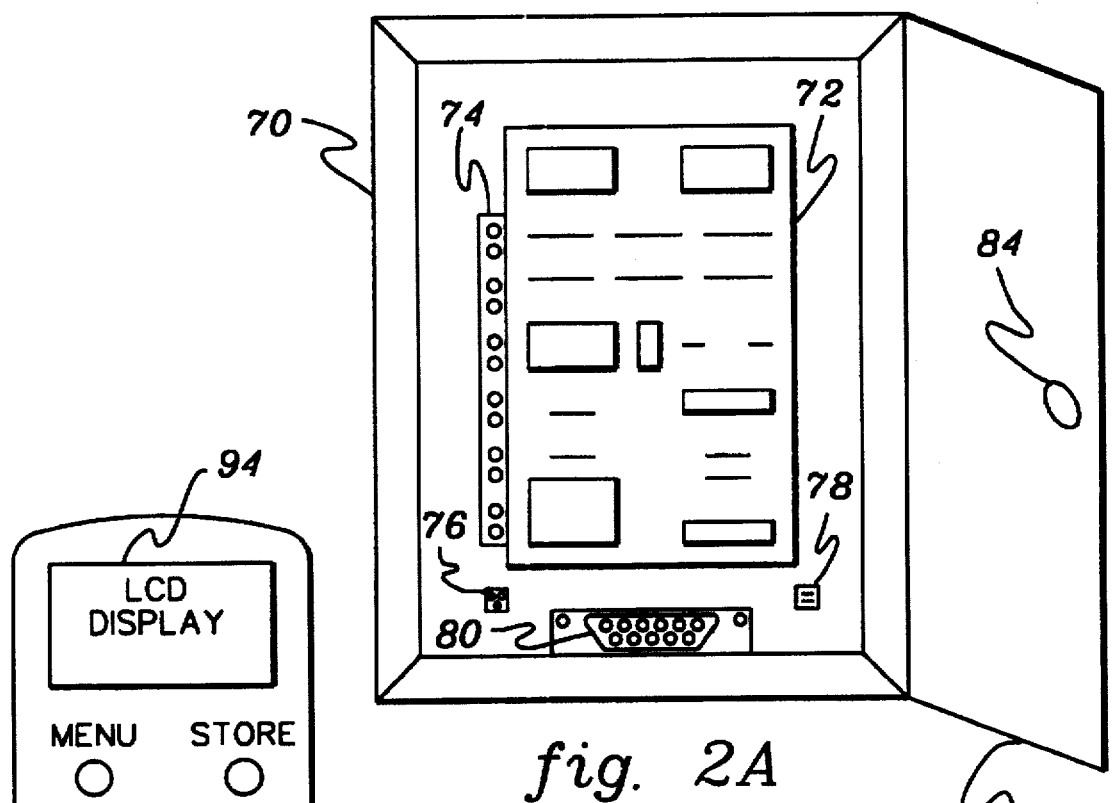
FIG. 2a is an elevational view of one embodiment of a wall-mounted central unit in accordance with the alarm processing system of FIG. 1.
Figure 2B:
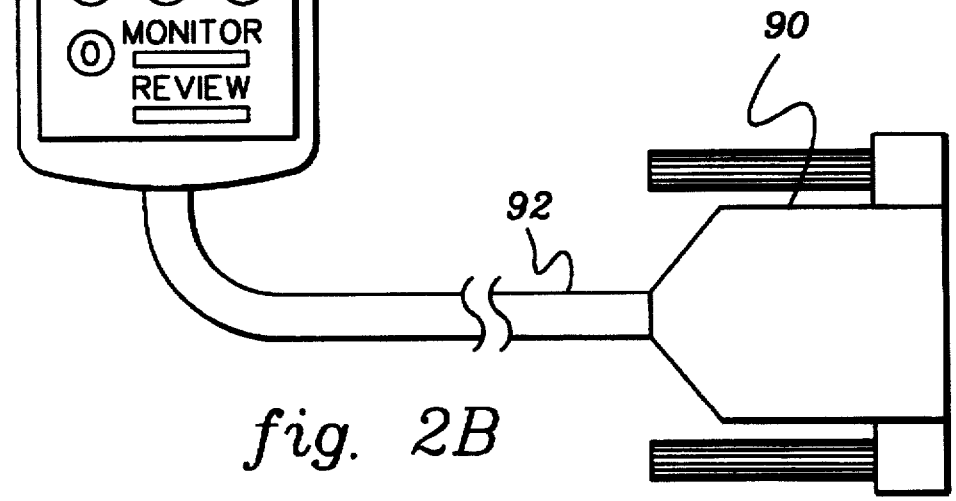
FIG. 2b is a plan view of one embodiment of an external programmer in accordance with the alarm processing system of FIG. 1.

One packaged embodiment of an alarm processing system in accordance with the present invention is depicted in FIGS. 2a & 2b by way of example; wherein FIG. 2a comprises the central unit and FIG. 2b is the detachable, external programmer. The central unit as depicted in FIG. 2a comprises a wall-mounted housing 70 within which a printed circuit board 72 is disposed. Circuit board 72 contains, for example, the circuitry of central unit 10 of FIG. 1. Remote sensor units are physically wired to central board 72 via an input terminal strip 74, which may comprise a plurality of paired spring-loaded connectors. A hardwired phone jack 76 couples to a traditional telecommunications line and, as described herein, can provide both communications and power facilities to the central unit.

An optional power back-up input 78 is also provided. For example, input 78 may electrically couple to a battery back-up system or to an existing alarm panel should, for example, a hardwired external power input (not shown) become deactivated and should the system be unable to draw power from the different telecommunications mediums. Although not shown in this figure, housing 70 could also include a speaker and a microphone pursuant to the central unit embodiment of FIG. 1. A port interface 80, such as a conventional RS232 connection, is provided for physically coupling the external programmer 12 (FIG. 2b) to the central unit. If desired, a closure door 82 and locking mechanism 84 can be provided for securing the wall-mounted portion of the alarm processing system.

As shown in FIG. 2b, detachable programmer 12 physically couples to the central wall mounted unit via a conventional RS232 connector 90 and cabling 92. External programmer 12 includes a microprocessor and a battery power unit such as, for example, a nine volt battery. The manual control options depicted on programmer 12 are presented herein by way of example only. As described further herein, programmer 12 is employed for custom preprogramming of EEPROM storage 40 (FIG. 1).

A significant feature of the present alarm processing system is that the central unit remains unpowered until an input contact is closed by a received alarm signal. Therefore, to enter programming mode, power must be supplied by external programmer 12 to the central unit. Further, controller 34 (FIG. 1) is preferably programmed to be "off-line" as soon as external programmer 12 is coupled thereto to avoid inadvertent dial out of a telephone number. The external programmer is employed to customize the communications function of the alarm processing system, i.e., store telephone numbers which identify remote locations to receive a programmed message upon occurrence of a respective alarm signal.

Figure 3A:
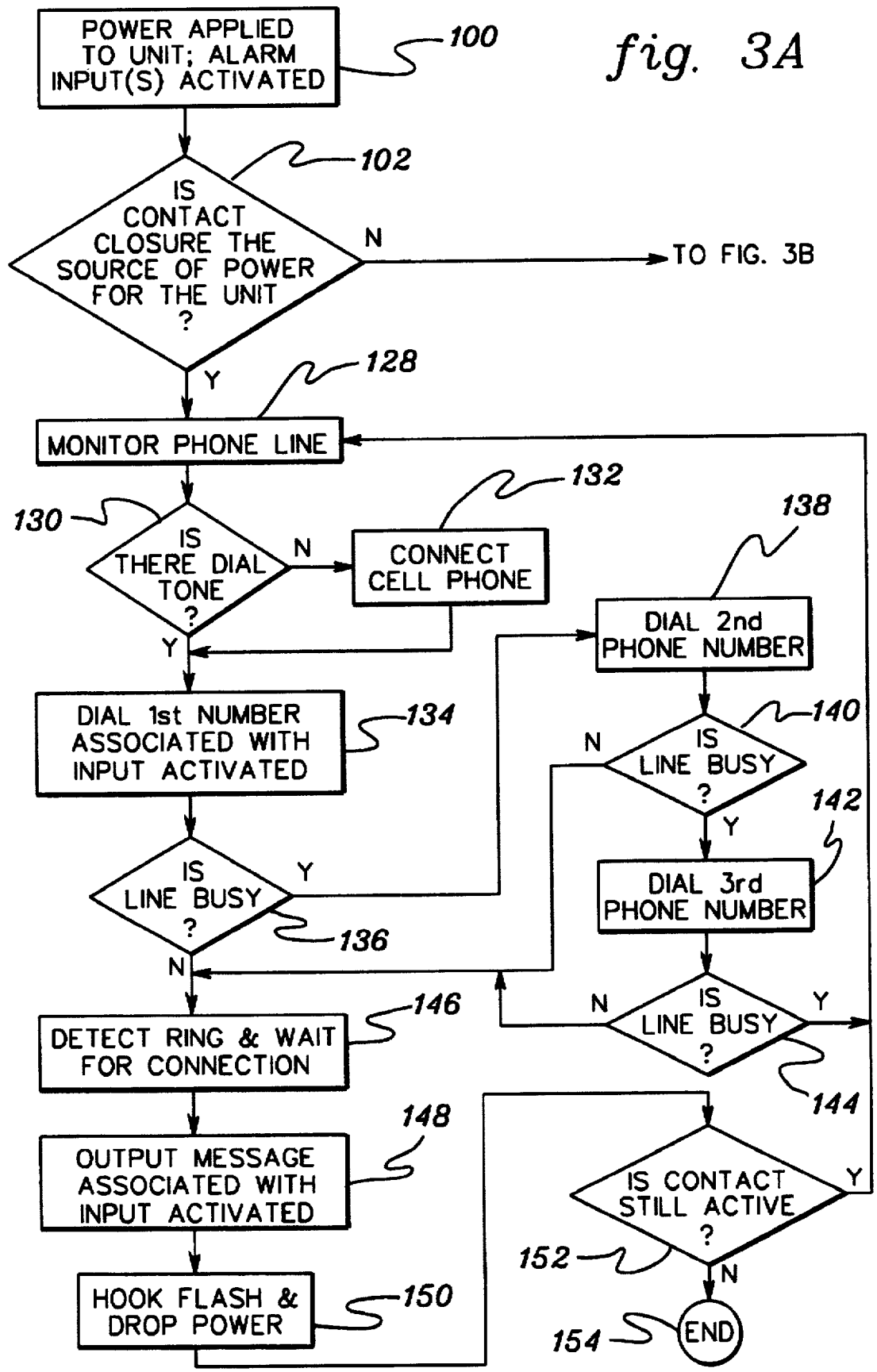
FIGS. 3a & 3b comprise a flowchart of one embodiment for processing an alarm signal and programing a central unit of an alarm processing system in accordance with the present invention.
Figure 3B:
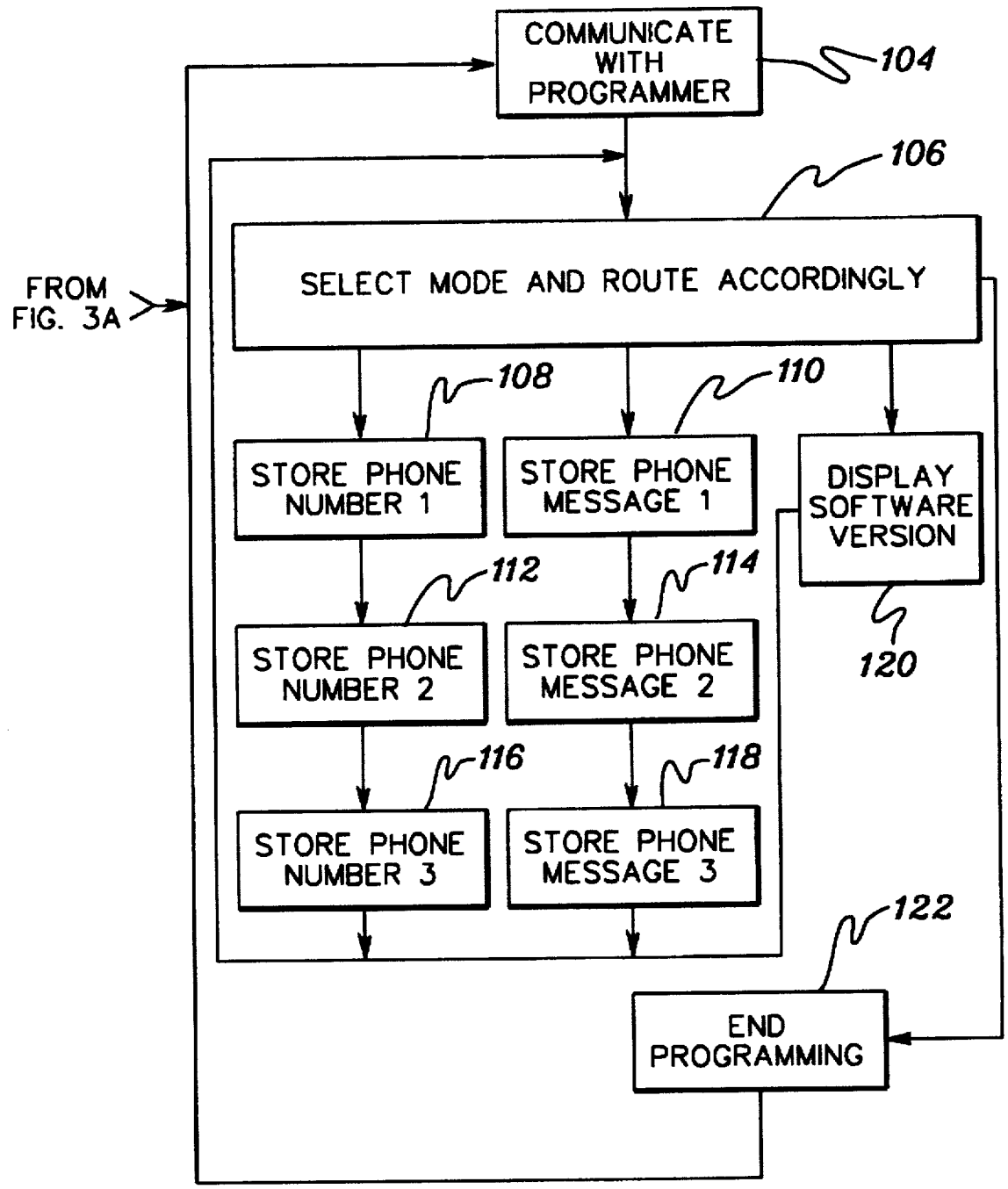

One embodiment of processing implemented by controller 34 (FIG. 1) in accordance with the present invention is depicted in FIGS. 3a & 3b. Again, power is applied to the central unit only upon activation of alarm input or coupling of the external programmer to the central monitoring unit 100. Thus, there is an initial inquiry whether powering of the central unit occurred pursuant to a contact closure 102. If "no," then power must have resulted from coupling of the external programmer to the central unit and communications with the external programmer are established 104 (FIG. 3b).

Continuing with FIG. 3b, the external programmer next selects a mode 106 and program instructions from program memory 38 route the CPU 34 accordingly. A first function is to store a first telephone number 108 and a corresponding phone message 110 for one of the alarm inputs to the central unit. If desired, a second phone number 112 and second phone message 114, along with a third phone number 116, and a third phone message 118 can also be held in EEPROM storage for retrieval upon occurrence of the associated alarm signal. Either the same message or different messages may be programmed for transmission to the remote receivers identified by the stored telephone numbers. Preferably, the select mode function 106 includes a mode whereby programmed information may be displayed for confirmation 120. Once all telephone numbers and messages have been entered, programming is ended 122 and the external programmer is decoupled from the central monitoring unit, thereby removing power to the central unit.

Returning to FIG. 3a, if powering of the central unit is initiated by a contact closure resulting from an alarm signal 102, then the selected telecommunications medium is monitored 128 for determination of whether there is a dial tone 130. Since the alarm processing system preferably defaults to a conventional telephone line, if there is no dial tone then the central unit activates the cellular phone unit 132. Once a telephone connection is confirmed, then the first telephone number is dialed 134. The central controller determines whether the dialed telephone number is busy 136 and, if "yes," the central unit dials a second programmed telephone number 138. In this embodiment, the process is repeated, 140, 142 & 144 for each of three preprogrammed telephone numbers. If the line is busy after dialing all three telephone numbers, processing loops back to repeat the process until a valid ring is identified 146.

After confirming connection, the preprogrammed message associated with the alarm signal received is output 148. In this embodiment, after a single message has been output, there is a hook flash and power drop to terminate the connection 150. Alternatively, processing could continue until all messages have been output. Thereafter, processing determines whether the input contact is still active 152 and if "yes," then the above-described telephone dial and message transmit procedure is repeated. Once the contact is deactivated, processing is terminated 154.

Further examples of a system and processing in accordance with the present invention are next discussed. The emergence of satellite paging has allowed a subscriber to leave a home territory and literally be in contact anywhere in the country, or for that matter the world. Conventionally, satellite paging is employed as a means to "beep" a subscriber to pick up a phone and call the contacting party. Because of its characteristics, satellite paging has the potential of becoming an advanced early warning system when integrated with concepts in accordance with the present invention. Testing has shown that an early warning signal from any point in the world to any other point in the world can average only approximately 20 seconds response time using satellite communications. This response time can be achieved using well known satellite paging equipment.

A numeric digital pager capable of displaying up to 16 digits on a built-in LCD display could be used. Such a pager is capable of receiving up to 8 sixteen digit messages before running out of memory, looping around and erasing a first message to make room for the next message. Nationwide satellite paging services are commercially available, along with computer message service back-up in case, for example, the pager battery was drained, or the pager is off at the time a message is sent. This provides a back-up system on the receiver end, with the computer message service perpetually calling the pager until the service has detected that the message has been received. Another advantageous service to subscribe to is a "group call unlimited" service so that the same message can be sent to multiple remote receiving units. By using a digital code it is possible to discriminate who among the group receives a given message.

Since digital pagers can only receive and display numbers, an alarm unit in accordance with the present invention is programmed such that each alarm input is assigned a particular digital code by the CPU. Thus, each code designates a specific problem. For instance, input 1 might detect heat within a set perimeter, in response to which the controller can be programmed to send a tone which will be converted into a first digital number on the pager display. Input 2 might detect smoke, and the unit would be programmed to output a tone that would be converted into a second digital number on the pager display.

When subscribing to a satellite paging service, the user is required to dial an "800" number to a computer system and listen to an automated voice that gives a set of instructions. During the course of these instructions, the computer waits at different intervals for the user to input information using the pads of a touch tone phone. Without the user inputting this information manually, a DTMF generator has to know when to send a signal. In particular, the controller has to be programmed to detect dial tone or off hook situations. When this occurs, the next programming stage is to dial a number, preferably the "800" number of the subscriber service. The CPU then detects call completion and knows when to send tones that represent numbers in the following sequence.

After call detection and pickup, a subscriber service computer will ask for a subscriber number which is the electrical identification number ("EIN") of the pager or pagers. This computer message takes "X" seconds to listen to, along with a prompt tone when to enter the EIN. By counting the seconds this takes during the programming stage of the unit, a pause can be programmed for the length of time the message represents. Tones representing the pager EIN are then programmed to be sent, along with a single end tone, for example, representing depression of the "#" on a touch tone phone, which also typically must be sent. A second set of instructions is then normally given from the automated subscriber service computer asking for the numeric message to be left. Traditionally, this is the point where a phone number to be sent to the pager user is entered. In accordance with the present invention, however, a numeric code representing something other than a phone number is entered. Again, this numeric code represents occurrence of a predefined condition at one or more monitored location(s). A second pause must then be programmed to represent the amount of time it takes to listen to the message, after which the numeric code is sent. Finally, a completion code, such as the tone of the "#" key, ends the up link and disconnects the monitoring unit from the subscriber service computer to thereby complete the mission and send the page.

Again, the present invention advantageously accomplishes all of the above without the aid of human intervention. Further, as noted above, the monitor unit in accordance with this invention is maintained in a sleep mode without drawing power for an extended length of time, perhaps years, and then automatically powers up upon receipt of an alarm input.

By way of further example, in the United States there are millions of underground storage tanks, each of which represents a serious environmental hazard if ruptured. History has shown that most of these tanks will rupture if left a sufficient amount of time. If these tanks are equipped with for example a ten dollar gas sensor, and coupled to a monitor unit in accordance with the present invention, with the pager subscriber option, then it is possible for an owner to know about a gas leak within seconds of its occurrence, irrespective of where the owner might be, or when the leak occurs. No other monitoring system provides such flexibility. Conceivably, the Environmental Protection Agency in Washington, D.C. could act as a home paging receiver wherein each underground tank in the United States could be equipped with a monitor device in accordance with this invention. Thus, within seconds of any leak, the agency responsible for overseeing such disasters would be immediately notified.

Another example would be to merge the satellite paging technology with the security monitoring industry, as discussed above. Thus, a satellite pager could be employed in substitution of the cellular phone in the example presented, or in addition thereto. In the event of multiple triggers, such as the telephone lines are down, electric power is down, and a break in or fire occurs at the same time, a system in accordance with the present invention would still operate to notify the interested parties of such occurrences. Further, the owner of a business or home can be personally notified of a problem simultaneous with notification be sent to a monitoring company. Utilizing the paging up link and group call feature of a paging service, a home or business owner who lives in this country, and may be on vacation overseas, could be continually monitoring the home or business. In summary, the present invention comprises a merging of telecommunications, security and satellite communications industries to present a new form of personal communication, with response times previously unknown.

Those skilled in the art will recognize from the above discussion that the present invention comprises an automatic, self-triggered alarm processing system and method designed to back-up or replace an existing alarm control system, while eliminating many key points of vulnerability inherent in existing alarm systems. Preferably, the system/method employs a non-volatile memory and processing is powered from one of a plurality of available energy sources by means of an automatic discretionary circuit which is activated upon receipt of an alarm signal from a remote sensor unit. Power can be derived from an existing alarm control panel, a battery back-up to an existing alarm control panel, a telephone transmission line, a cellular phone power supply, a cellular phone battery back-up, an independent power supply and/or an independent power supply back-up.

Preferably, the alarm processing system is programmed via a detachable external programming module to ensure security. Programmed patterns are stored in non-volatile memory so that parameters remain intact notwithstanding interruption in power. With appropriate program instructions, consecutive dial-out of a plurality of numbers is available, as are detection of call progress tones, programmable pauses, synthesized voice transmission, DTMF or pulse digit transmission, digital numeric or alphanumeric transmission and programmable repeats. The alarm processing system may be employed with a variety of different sensors, such as wired, wireless, smoke, fire, intrusion, electrical or radio variation, liquid flow, pressure variances, leakage detection, liquid, vapor, gas, etc. By improving the choice of power source and the choice of transmission medium, a significant decrease in the occurrence of alarm failure is achieved.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. An alarm processing system for monitoring at least one sensor unit, each sensor unit providing an alarm signal upon occurrence of a corresponding predefined condition, said alarm processing system comprising:

means for receiving an alarm signal generated by a sensor unit of the at least one sensor unit upon occurrence of the sensor unit's corresponding predefined condition;

means for triggering powering of said alarm processing system upon receipt of said alarm signal, said means for triggering comprising means for automatically transitioning said alarm processing system from a dormant, unpowered state to an active, at least partially powered state, said means for automatically transitioning being responsive to receipt of said alarm signal;

a central processing unit for retrieving from a memory connected thereto a predefined alarm message in response to said alarm signal;

means for designating a selected telecommunications medium from at least two telecommunications medium coupled to said alarm processing system; and means for automatically sending said predefined alarm message across said selected telecommunications medium.

2. The alarm processing system of claim 1, further comprising power supply means for supplying power to said alarm processing system, said power supply means being electrically coupled to said means for triggering powering of said alarm processing system, wherein upon receipt of said alarm signal, said means for triggering powering triggers said power supply means to supply power to said alarm processing system, said power supply means being electrically coupled to at least one telecommunications medium of said at least two telecommunications medium, said power supply means comprising means for extracting power from said at least one telecommunications medium for powering said alarm processing system.

3. The alarm processing system of claim 2, further comprising means for conserving power within the alarm processing system such that current draw within the alarm processing system is below an available current level from said at least one telecommunications medium.

4. The alarm processing system of claim 3, wherein said means for conserving power comprises means for selectively activating and deactivating circuitry within the alarm processing system.

5. The alarm processing system of claim 1, wherein said means for triggering powering of said alarm processing system includes a contact switch coupled to said means for receiving and to said central processing unit, said contact switch being activated by receipt of said alarm signal.

6. The alarm processing system of claim 1, wherein said means for automatically sending said predefined alarm message includes means for automatically consecutively sending said predefined alarm message across said selected telecommunications medium to multiple remote receivers.

7. The alarm processing system of claim 1, further comprising a portable external programmer detachably coupled to said central processing unit, said portable external programmer including means for pre-identifying a remote receiver location to receive said predefined alarm message to be sent by said means for automatically sending.

8. The alarm processing system of claim 7, wherein said portable external programmer includes means for predefining for storage in said memory a unique alarm message response to the alarm signal generated by each sensor unit upon sensing of its corresponding predefined condition.

9. The alarm processing system of claim 7, wherein said portable external programmer includes means for powering said alarm processing system when said portable external programmer is electrically coupled to said central processing unit.

10. The alarm processing system of claim 1, wherein a telecommunications medium of said at least two telecommunications medium comprises a satellite paging medium.

11. The alarm processing system of claim 1, further comprising a speech processor for synthesizing an audio message from said predefined alarm message retrieved by said central processing unit for transmission over said selected telecommunications medium.

12. The alarm processing system of claim 1, wherein said means for triggering powering further comprises means for testing power level of each of multiple power sources available to power the alarm processing system, wherein at least one of said multiple power sources comprises one telecommunications medium of said at least two telecommunications medium coupled to the alarm processing system.

13. The alarm processing system of claim 12, wherein said means for triggering powering further comprises means for selecting a strongest power source of said multiple power sources in response to said means for testing.

14. The alarm processing system of claim 1, wherein said means for triggering powering comprises means for extracting power from one telecommunications medium of said at least two telecommunications medium for powering said alarm processing system, said one telecommunications medium of said at least two telecommunications medium for powering said alarm processing system also comprising said selected telecommunications medium for sending the predefined alarm message.

15. An alarm processing system for monitoring at least one sensor unit, each sensor unit providing an alarm signal upon occurrence of a corresponding predefined condition, said alarm processing system comprising:

means for receiving an alarm signal generated by a sensor unit of the at least one sensor unit upon occurrence of the sensor unit's corresponding predefined condition;

means for triggering powering of said alarm processing system upon receipt of said alarm signal;

a central processing unit for retrieving from a memory connected thereto a predefined alarm message in response to said alarm signal;

means for designating a selected telecommunications medium from at least two telecommunications medium coupled to said alarm processing system;

means for automatically sending said predefined alarm message across said selected telecommunications medium; and wherein a first telecommunications medium of said at least two telecommunications medium comprises a conventional telephone line and wherein a second telecommunications medium of said at least two telecommunications medium comprises a cellular phone unit, and wherein said power supply means is electrically coupled to both said conventional telephone line and to said cellular phone unit and includes means for extracting power from either of said conventional telephone line and said cellular phone unit.

16. The alarm processing system of claim 15, wherein said power supply means includes means for selecting a power source, said power source comprising one of the conventional telephone line and the cellular phone unit.

17. The alarm processing system of claim 15, wherein said power supply means includes means for selecting a power source, said power source comprising one of the conventional telephone line, the cellular phone unit, and an external power input to the alarm processing system.

18. A self-triggering, alarm processing system for monitoring at least one sensor unit, each sensor unit providing an alarm signal upon occurrence of a corresponding predefined condition, said alarm processing system being coupled to at least one telecommunications medium, said alarm processing system comprising:

means for receiving an alarm signal generated by a sensor unit of the at least one sensor unit upon occurrence of the sensor unit's corresponding predefined condition;

power means for powering said alarm processing system;

means for triggering said power means upon receipt of said alarm signal; and wherein said power means includes means for deriving power from said at least one telecommunications medium to drive said alarm processing system upon triggering by said means for triggering.

19. The self-triggering, alarm processing system of claim 18, wherein said alarm processing system comprises multiple circuits, and wherein said alarm processing system further comprises means for conserving power by selectively activating circuits of said multiple circuits as needed and selectively deactivating said selected circuits when unneeded, said means for conserving power being sufficient to maintain a current draw of said alarm processing system below a current level available through said at least one telecommunications medium.

20. The self-triggering, alarm processing system of claim 18, wherein said means for triggering said power means includes a contact switch coupled to said power means and to said means for receiving said contact switch means being activated by receipt of said alarm signal.

21. A self-triggering, alarm processing system for monitoring at least one sensor unit, each sensor unit providing an alarm signal upon occurrence of a corresponding predefined condition, said alarm processing system being coupled to at least one telecommunications medium, said alarm processing system comprising:

means for receiving an alarm signal generated by a sensor unit of the at least one sensor unit upon occurrence of the sensor unit's corresponding predefined condition;

power means for powering said alarm processing system;

means for triggering said power means upon receipt of said alarm signal;

wherein said power means includes means for deriving power from said at least one telecommunications medium to drive said alarm processing system upon triggering by said means for triggering; and wherein a first telecommunications medium of said at least one telecommunications medium comprises a conventional telephone line and a second telecommunications medium of said at least one telecommunications medium comprises a cellular phone unit, and wherein said power means includes means for automatically selecting between and deriving power from one of said conventional telephone line and said cellular phone unit to drive said alarm processing system upon triggering by said means for triggering.

22. A self-triggering, alarm processing system for monitoring at least one sensor unit, each sensor unit providing an alarm signal upon occurrence of a corresponding predefined condition, said alarm processing system being coupled to at least one telecommunications medium, said alarm processing system comprising:

means for receiving an alarm signal generated by a sensor unit of the at least one sensor unit upon occurrence of the sensor unit's corresponding predefined condition;

power means for powering said alarm processing system;

means for triggering said power means upon receipt of said alarm signal;

wherein said power means includes means for deriving power from said at least one telecommunications medium to drive said alarm processing system upon triggering by said means for triggering; and further comprising an external power supply input coupled to the alarm processing system, and wherein said power means includes means for selecting between deriving power from said at least one telecommunications medium or said external power supply input.

23. In an alarm processing system, an automated method for monitoring and responding to at least one sensor unit, each sensor unit providing an alarm signal upon occurrence of a corresponding predefined condition, said automated method comprising the steps of:

(a) receiving an alarm signal generated by a sensor unit of the at least one sensor unit upon occurrence of the sensor unit's corresponding predefined condition;

(b) automatically triggering powering of said alarm processing system upon receipt of said alarm signal, said automatically triggering comprising automatically transitioning said alarm processing system from a dormant, unpowered state to an active, at least partially powered state, said automatically transitioning being responsive to receipt of said alarm signal;

(c) retrieving a predefined alarm message stored in memory within said alarm processing system in response to said alarm signal;

(d) designating a selected telecommunications medium from at least two telecommunications medium coupled to the alarm processing system; and (e) automatically sending the predefined alarm message across the selected telecommunications medium.

24. The automated method of claim 23, further comprising the step of terminating powering of said alarm processing system subsequent to said automatically sending step (e).

25. In an alarm processing system, an automated method for monitoring and responding to at least one sensor unit, each sensor unit providing an alarm signal upon occurrence of a corresponding predefined condition, said automated method comprising the steps of:

(a) receiving an alarm signal generated by a sensor unit of the at least one sensor unit upon occurrence of the sensor unit's corresponding predefined condition;

(b) automatically triggering powering of said alarm processing system upon receipt of said alarm signal;

(c) retrieving a predefined alarm message stored in memory within said alarm processing system in response to said alarm signal;

(d) designating a selected telecommunications medium from at least two telecommunications medium coupled to the alarm processing system;

(e) automatically sending the predefined alarm message across the selected telecommunications medium; and wherein said automatically triggering powering step (b) includes automatically selecting a power source from multiple power sources coupled to drive said alarm processing system, said multiple power sources including said at least two telecommunications medium and an external power supply.

26. The automated method of claim 25, wherein said automatically sending step (e) includes automatically sending said predefined alarm message across said selected telecommunications medium to at least one remote receiver location of multiple remote receiver locations prestored in said memory.

27. The automated method of claim 26, wherein said retrieving step (c) includes retrieving multiple predefined alarm messages stored in said alarm processing system, each predefined alarm message being predesignated for transfer to a different remote receiver location of said multiple remote receiver locations such that said automatically sending step (e) includes automatically sending at least one predefined alarm message of the multiple predefined alarm messages across the selected telecommunications medium to the at least one predesignated remote receiver location of the multiple remote receiver locations.

28. In an alarm processing system, an automated method for monitoring at least one sensor unit, each sensor unit providing an alarm signal upon occurrence of a corresponding predefined condition, said automated method comprising the steps of:

(a) receiving an alarm signal generated by a sensor unit of the at least one remote sensor unit upon occurrence of the remote sensor unit's corresponding predefined condition; and (b) automatically triggering powering of the alarm processing system upon receipt of the alarm signal, said automatically triggering including automatically transitioning the alarm processing system from a dormant, unpowered state to an active, at least partially powered state, said automatically transitioning being responsive to said receiving (a) of the alarm signal.

29. The automated method of claim 28, wherein said alarm processing system is coupled to at least one telecommunications medium, and wherein said method further comprises deriving power from the at least one telecommunications medium coupled to the alarm processing system to drive the alarm processing system upon said automatically triggering powering step (b).

30. The automated method of claim 29, further comprising automatically sending a predefined alarm message across the at least one telecommunications medium in response to said alarm signal and terminating powering of said alarm processing system subsequent to said automatically sending of the predefined alarm message.

31. In an alarm processing system, an automated method for monitoring at least one sensor unit, each sensor unit providing an alarm signal upon occurrence of a corresponding predefined condition, said automated method comprising the steps of:

(a) receiving an alarm signal generated by a sensor unit of the at least one remote sensor unit upon occurrence of the remote sensor unit's corresponding predefined condition; and (b) automatically communicating a predefined message across a first, land-based telecommunications medium to a remote computer, said predefined message corresponding to the remote sensor unit's alarm signal received in said step (a); and (c) automatically communicating a digitally coded message across a second, satellite-based telecommunications medium from the remote computer to a remote receiver, said digitally coded message being produced from said predefined message of said automatically communicating (b) received at the remote computer.

32. An alarm processing system for monitoring at least one sensor unit, each sensor unit providing an alarm signal upon occurrence of a corresponding predefined condition, said alarm processing system comprising:

means for receiving an alarm signal generated by a sensor unit of the at least one sensor unit upon occurrence of the sensor unit's corresponding predefined condition;

means for automatically retrieving a predefined message in response to said alarm signal, said predefined message corresponding to occurrence of said corresponding predefined condition;

means for automatically communicating the predefined message across a first, land-based telecommunications medium to a remote computer; and means for automatically communicating a digital message from the remote computer to a remote receiver across a second, satellite-based telecommunications medium, said digital message being produced from the predefined message communicated to the remote computer.

33. The automated method of claim 31, wherein said automatically communicating (b) comprises automatically communicating the predefined message across the first, land-based telecommunications medium to the remote computer as a predefined series of tones and pauses predefined to communicate with the remote computer.

* * * * *